2,805,168

CHEMICALLY MODIFIED LIGNO-CELLULOSIC MATERIALS

John J. Bradley, Jr., Winchester, Mass., assignor to Agrashell, Inc., Los Angeles, Calif., a corporation of Delaware No Drawing. Application May 6, 1953,
Serial No. 353,431

18 Claims. (Cl. 106—163)

This invention relates to new compositions of matter which may be referred to as chemically modified naturally occurring ligno-cellulosic materials typified by nut shells, bark phloems and hydrolysis degradation products of oat hulls. A number of these materials in their natural state, have been used for some time in finely divided form for several industrial purposes, for example as fillers or extenders in glues and as cleaning compositions.

A primary object of the invention is to provide new compositions of matter for use in wall and floor coatings and coverings, in molding compositions to produce molded products in all shapes including wall boards, and in adhesive compositions including plywood resin glue emulsions. The function or functions served by the new compositions include performance as a filler, extender, bodying agent, smoothing agent, homogenizing agent, or spreading agent.

Another object is to provide from such naturally occurring organic materials, various compositions which are compatible with aqueous media and hence can be employed in aqueous formulations for utilization in the above mentioned fields. Specifically, an object is to provide a bloom-preventing component for aqueous resin base coating compositions.

The process of the invention may be defined broadly as involving the reaction of finely divided organic material herein described with an alkali metal hydroxide, as sodium hydroxide, and a difficultly soluble alkaline hydroxide, as calcium hydroxide, whereby the organic material is altered and reaction products composed at least in part of insoluble derivatives of components of the material are obtained. The organic material is preferably as fine as 325 mesh but coarser particles can be satisfactorily treated.

The ligno-cellulosic materials may be any one of three types. The first type may be generically described as endocarps of drupes. Included within the class are shells of nuts such as walnut, hickory, palm, and filbert; pit shells of fruits such as peach, prune and apricot; the hulls of grains and seeds such as oat hulls and the cones or strobiles of coniferous trees. In comparison with the other types of material to be defined these "vegetable shell" materials contain a relatively small quantity of lignin. Walnut shell flour contains, for example 24% lignin by weight.

The second type of raw material contemplated may be referred to generically as vegetable material comprising principally the non-fibrous component of bark phloem, such as may be obtained from pine, hemlock, fir and cedar trees. These bark materials generally contain a very much higher percentage of lignin, typically about 59%.

The third type of material used may be referred to generically as degradation residues derived by the hydrolysis of oat hulls, corn cobs, cotton seed hulls and the like, which contain a high percentage of extractable pentosans. These products are commercially available by-products obtained by the acid or alkaline degradation of the raw materials. The degradation products are the residues left from the commercial extraction of the pentosan content. These residues contain an intermediate amount of lignin and typically about 42%. Other high pentosan content agricultural products suitable as raw materials are described in an article by G. H. Nelson et al. entitled "Chemical composition of grain and seed hulls, nut shells and fruit pits" appearing in Transactions, American Association of Cereal Chemists, volume VIII, No. 1, January 1950 (pages 58–68).

While these three types of materials are basically the same to the extent that they respond to the chemical treatment of the present invention and the resulting products may perform equally well in some fields, it should be understood that the products are not identical nor equal in quality, for they do not possess all the same properties and some of them perform in a substantially superior way in certain uses.

The "alkali metal" hydroxide as defined herein is intended to include ammonium hydroxide as well as the hydroxides of the true alkali metals, as sodium and potassium. The difficultly soluble alkaline hydroxide may be the hydroxide of any one or combination of a large number of metals variously classified as to degrees of solubility and including compounds generally rated as "insoluble" but still are soluble to a very slight extent. There may be mentioned, for example, the hydroxides of calcium, barium, magnesium, zinc, copper, lead, iron, cobalt, nickel, aluminum and manganese. These hydroxides have the common function of providing insoluble reaction products in the reaction mass. They may be thought of as insolubilizing reagents, for in their absence the alkali metal hydroxide would produce only soluble derivatives in the reaction mass.

Although these difficultly soluble alkaline compounds are at least theoretically in the form of hydroxides at the time they are reacted, they need not be introduced into the reaction mixture in such form. These reagents can be introduced in the form of their oxides, as for example, lime, and the oxides of barium, copper, magnesium and zinc.

The amount of the mixture of the two alkaline compounds which can be employed in the process of the invention varies within very wide limits. Although any appreciable amount may produce beneficial results, at least 4% in relation to the amount of the organic material employed is ordinarily required. The amount of the reagents employed in any particular instance depends upon several factors including the nature of the raw material treated and the use to which the final product is to be put. Since the amount of lignin in the initial materials differ, the amount of the reagents which can be reacted varies substantially.

Furthermore, the reaction can be carried out in such manner as to effect complete reaction with substantially all of the lignin present or alternatively the conditions can be regulated such that only a superficial reaction on the particles will be obtained. Finally, the reaction may be carried out in such manner that only a part of the raw material will be reacted to any substantial extent with either or both of the alkaline reagents. In this latter case the reaction may be carried out initially with a part of the organic material and/or part of the second alkaline reagent and the reaction may be continued to a more or less extent in the presence of a second addition of organic material and/or reagent. Under one of the procedures it will be seen that unaltered particles will be present in admixture with the modified particles.

The relative proportions as between the two alkaline reagents which can be employed in the operation of the invention, will vary in relation to the desired properties of and intended use of the products to be obtained. In most uses it is preferred that the reagents be used in substantially equal molecular proportions. Under this procedure, the products produced may contain little or no water-soluble derivatives. If the amount of alkali metal hydroxide used is in excess of the equivalent amount, then soluble components may remain in the mass and lead to final coatings and coverings of inadequate weather-resistance. A small proportion of these soluble components, however, may serve a desirable function in some aqueous media in which the products can be employed.

If the amount of difficultly soluble alkaline compound used exceeds that of the alkali metal hydroxide, then the final product may contain a quantity of insoluble alkali corresponding more or less to the amount of the excess. In some uses the presence of a small amount of lime or other insoluble material may have no ill effect and in fact may be beneficial in providing alkaline conditions required for various coating resins.

The reaction of the organic materials with the alkaline reagents may be carried out at any temperature, as from room temperature to boiling. Ordinarily heat in moderate amounts is desirable to speed up the rate of reaction.

In accordance with one of the features of the invention the reaction is carried out without applying heat to the reaction mixture. Adequately elevated temperatures are obtained by utilizing only autogenous heat or the heat of dissolution of the alkali metal hydroxide and the heat of wetting developed when water is mixed with the finely divided organic material. By the utilization of these sources of heat the reaction mass can be increased in temperature by from about 35 to 60 or possibly 70° F. above normal atmospheric temperature dependent on the procedure employed and the quantity of the composition processed in relation to the amount of alkali and water present.

With the temperature increase developed by the reagents, the reaction will proceed adequately in a period of from about 25 to 30 minutes. At higher temperatures the period may be shorter and at lower temperatures the time required is increased.

In an alternative procedure, part of the finely divided organic material is mixed with the alkali metal hydroxide and heated to a higher temperature, as from 160° F. to boiling, after which the reaction mass is permitted to cool somewhat whereupon the difficultly soluble alkaline oxidic compound together with the remainder of the organic material is added. In this reaction the soluble hydroxide can be made to react with most, if not all, of the lignin present in the raw material and the presence of the reaction product in solution in the mass will provide a composition of very high viscosity. The lime or other difficultly soluble alkaline reagent added reacts with the solubilized components made up at least in part of sodium lignate and forms insoluble compounds in a mass in which the unreacted or only slightly reacted additional organic material serves at least two functions, namely, as a sealer which prevents excessive penetration when the composition is used in coating compositions on porous surfaces and as a cost reducer in lessening the amount of more expensive components required.

The chemically altered organic materials of the present invention may be used with substantial advantage in so-called resin-water base coating compositions. They are compatible with water and with water-soluble polymerizable resins utilizable in such water base coating compositions. For example, they may be used successfully in combination with phenolic resins in coating compositions to be used particularly for application to and waterproofing of wall coverings, as boards and papers, and for coating containers such as paper bags, cardboard or corrugated cartons, etc.

These coating compositions in aqueous emulsion form spread very easily and evenly over the surfaces to be coated. The presence of the modified organic material prevents excessive penetration of the resin into the surface to which it is applied and hence reduces the quantity of coating composition required. The combination of the phenol-formaldehyde coating resins with the modified organic materials provide effective water-proof coatings of low cost both as to materials and as to application.

Among the resin compositions with which the modified organic materials of the present invention may be used are urea resins, melamine resins, proteinous resins, furfuryl resins and the like; all in addition to phenolic resins.

The modified organic materials of the present invention also constitute excellent bodying agents for adhesives used particularly in plywood manufacture. Tests have shown that these modified organic materials when mixed with resin glue solutions provide plywood adhesive compositions of increased viscosity having thixotropic properties both of which properties provide superior action on the spreading rolls. The amount of resin required is greatly reduced, for more of the extender and more water can be incorporated in the adhesive composition.

Adhesive composition capable of producing high grade plywood for exterior use can be provided, for example, by reacting 20 to 50 parts vegetable shell flour with 1 to 10 parts of sodium hydroxide and 1 to 10 parts of calcium oxide in the presence of 20 to 140 parts of water, and mixing with 100 parts ordinary commercial phenolic resin glue emulsion (40–50% solids). When some bards and degradation products are employed similar proportions can be used, but the plywood may be suitable only for interior use, but would be classified as a very high grade interior plywood.

*Example 1*

A mixture was made of 7.7 parts of dry sodium hydroxide, 7.7 parts of dry calcium oxide and 50 parts of walnut shell flour and stirring together for 10 minutes. Thereupon 110 parts of water was added and the mixture was stirred for 30 minutes. The product obtained as such or after evaporation of some or all of the water present constitutes a new extender having excellent properties for introduction into coating compositions. By incorporating the same in phenol-formaldehyde resin coating compositions, a material is obtained capable of water-proofing wall boards and containers at low cost.

*Example 2*

A mixture was made of 2 parts of dry sodium hydroxide, 3 parts of dry calcium oxide and 20 parts of walnut shell flour and stirring together for from 5 to 10 minutes. Thereupon an amount of water (20 parts) required to wet the dry mixture was added and the mixing continued for 30 minutes. During the mixing, the temperature increased by 43° F.

To provide an adhesive composition for plywood manufacture from the chemically altered shell flour, the obtained mass was mixed with 100 parts of a phenol-formaldehyde resin glue solution of commercial grade having 41.6% solids content, a viscosity F at 25° C. (G and H tubes), a pH value of 11.85 at 25° C. and having an infinite water tolerance at such temperature. The resin glue solution possessed thixotropic properties and a highly advantageous viscosity for application in the glue machine. Plywood produced from the new adhesive solution possessed excellent qualities.

*Example 3*

Twenty parts of bark flour was first wetted by mixing with an amount of water required to wet the flour and provide good mixing, and the mixture was stirred for from 5 to 10 minutes until thorough wetting had occurred. Thereupon 3.85 parts of sodium hydroxide in the form of a 15 to 30% solution, freshly prepared, and containing an equal amount of calcium oxide was added to the wetted shell flour and the whole mixed for about 25 to 30 minutes. The total amount of water to be employed was 60 parts and if any remained to be added it was introduced into the mixture after the reaction was complete, thereby cooling the mixture. If any water is added after the reaction is complete, it is mixed into the mass for 5 minutes to provide a homogeneous solution. This mixture as initially produced may be used as is, or water may be evaporated therefrom to provide a paste for sale to fabricators of coating compositions.

The diluted mass may be directly utilized in the production of adhesive compositions for plywood manufacture. The addition of the emulsion to 100 parts of a phenolic resin emulsion and mixing for from 5 to 10 minutes provided an adhesive composition having similar good qualities for ready application to veneers. Plywood produced therefrom possessed excellent properties. In a number of operations, the phenolic glue emulsion was that described in connection with Example 2 and in others it was one having 49.8% solids, a viscosity of X, a pH of 11.1 and a water tolerance of 800.

*Example 4*

By the procedure described in Example 2, 50 parts of an acid-hydrolysis degradation product of oat hulls were mixed with 7.7 parts of sodium hydroxide and 7.7 parts of calcium oxide, after which 110 parts of water were added. The temperature rose 57° F. Thereupon 30 parts of water were added to cool the mass.

The addition of 100 parts of resin such as described in Example 3 produced an adhesive composition of high quality. A very high quality interior plywood was obtained by utilization of the adhesive composition.

*Example 5*

In accordance with the procedure of Example 3 a reaction mass was produced by reacting 50 parts of walnut shell flour with 7.7 parts of sodium hydroxide and 7.7 parts of calcium oxide, in the presence of 100 parts of water. After the reaction was complete 30 parts of water were added to cool the mass.

To provide an adhesive composition the resulting modified shell flour was mixed with 100 parts of the resin defined in Example 2. As a result an adhesive composition of excellent properties was obtained and plywoods produced therefrom possessed excellent properties for exterior use.

The alkali modified ligno-cellulosic materials of the present invention can be employed successfully in phenolic resin coating compositions for the covering or waterproofing of construction materials, particularly plywood and pressed boards, such as Masonite, and also boards made of asbestos. Operable formulations include those set forth in the following table:

| | Parts by weight |
|---|---|
| Phenolic coating resin | 100 |
| Vegetable shell flour | 20–50 |
| Sodium hydroxide | 2–7.5 |
| Calcium oxide | 3–7.5 |
| Water | 20–130 |

The coating compositions containing proportions set out in this table may be prepared by first producing the modified shell flour extender by the dry method hereinbefore described involving mixing the vegetable shell flour with the two alkalies in dry form, adding resin solution or emulsion, and mixing for 25 to 30 minutes.

A suitable phenolic resin is disclosed in Experimental Plastics and Synthetic Resins by G. F. D'Alelio (published 1946), page 16. A phenolic coating resin may be produced, for example, by reacting 1 mol of phenol with 2 mols of formaldehyde with the aid of sodium hydroxide amounting to 3% of the phenol by weight, at a temperature of from 85 to 100° C. until the desired viscosity is reached. The resulting resin solution will possess a pH value of from 9.5 to 10.5. The pH value, however, may be varied from a value of 8 to about 11.

Coating compositions of the present invention compounded with proportions within those limits set out in the above table produce smooth, high gloss surfaces that are very resistant to water and chemicals when coatings are prepared under heat and pressure.

The use of the novel extender in the amounts called for in the said table prevent absorption of the resin and do not materially affect the color or transparency of the coating. For the production of coatings upon the exterior surfaces of plywood it is preferable that formulations be made up to contain relatively low amounts of extender and higher percentages of the resin.

Plywood coated on its exterior surfaces is especially suited for making forms for the construction of concrete floors. Such coating is resistant to the action of wet concrete and thus the life of the plywood is not limited to a single use, which is in contrast to the oil-coated plywood now used for such purpose.

Plywood manufacturers can apply the coating compositions of the present invention to the exterior surfaces of assembled plywood sections. While the adhesive bond between the plies is created in exactly the same manner as at present, the outside surface of the two outer plies of each section is mechanically covered with the coating composition of the present invention and the resulting surfaces are then protected by a spreader such as a sheet of aluminum which prevents the plywood sections from sticking together. The assembled stack of the plywood sections is thereafter loaded into a hot press and cured in the usual manner. The exterior coating sticks well to the wood, but not to the aluminum and therefore the plywood sections can be readily separated after the curing has been effected. The smooth surface of the aluminum metal creates a continuous high gloss film on the plywood.

The coating of already prepared wall boards or press boards may be accomplished simply by spreading the coating composition on one side of the board by conventional mechanical operations and then stripping off any excess with a doctoring device leaving only a very little more coating on the surface of the board than just enough to create a very thin film thereon. This coating and scraping technique can also be used successfully in the application of the coating composition in the preparation of water-proof paper.

It will be noticed that in Examples 4 and 5 the amount of the extender used is very high and hence the cost of the adhesive composition is greatly reduced in comparison with conventional glue compositions which can hold less than one-half as much of the organic material when in its natural state.

I claim:

1. A process for producing non-fibrous organic materials in finely divided form from ligno-cellulosic materials which comprises, mixing said materials in finely divided form with essentially only an alkali metal hydroxide and a difficultly soluble inorganic alkaline hydroxide in aqueous solution and reacting said materials with said hydroxides.

2. A process for producing non-fibrous organic materials in finely divided form from ligno-cellulosic materials which comprises, mixing said material in finely divided form, together with an alkali metal hydroxide, a difficultly soluble inorganic alkaline hydroxide, and water and after reaction between said materials and said hydroxides has occurred, removing any excess water.

3. A process for producing non-fibrous organic materials in finely divided form from endocarps, bark phloem and lignocellulosic hydrolysis degradation residues of oat hulls and corn cobs which comprises, mixing together said material in finely divided form with an alkali metal hydroxide, a difficultly soluble inorganic alkaline hydroxide, and water and reacting the said material with the said hydroxides at the temperature developed by autogenous heat of the mixture.

4. A process for producing non-fibrous organic materials in finely divided form from endocarps, bark phloem and lignocellulosic hydrolysis degradation residues of oat hulls and corn cobs which comprises, reacting said materials in finely divided form with an alkali metal hydroxide and a difficultly soluble inorganic alkaline hydroxide, the hydroxides being in substantially equivalent quantities.

5. A process for producing non-fibrous organic materials in finely divided form from endocarps, bark phloem and lignocellulosic hydrolysis degradation residues of oat hulls and corn cobs which comprises, reacting said materials in finely divided form with a mixture of an alkali metal hydroxide and a difficultly soluble inorganic alkaline hydroxide in quantities producing a substantially insoluble final product.

6. A process for producing non-fibrous organic materials in finely divided form from endocarps, bark phloem and lignocellulosic hydrolysis degradation residues of oat hulls and corn cobs which comprises, mixing said material in finely divided form, together with an alkali metal hydroxide, a difficultly soluble inorganic alkaline hydroxide, and water until a uniform composition is formed, reacting the said material with the said hydroxides, and forming a paste of the reaction product obtained.

7. A process for producing non-fibrous organic materials in finely divided form from endocarps, bark phloem and lignocellulosic hydrolysis degradation residues of oat hulls and corn cobs which comprises, mixing said materials in finely divided form with a dry mixture of an alkali metal hydroxide and compounds selected from the group consisting of the difficultly soluble inorganic alkaline hydroxides and their corresponding oxides and thereafter with water, and discontinuing the mixing when a uniform composition is obtained, whereby a reaction product of the alkaline reagents with the organic materials is obtained.

8. A process for producing non-fibrous organic materials in finely divided form from endocarps, bark phloem and lignocellulosic hydrolysis degradation residues of oat hulls and corn cobs which comprises, reacting said materials in finely divided form with sodium hydroxide and calcium hydroxide.

9. A finely divided composition of matter comprising essentially only the reaction product of ligno-cellulosic material with an alkali metal hydroxide and with a difficultly soluble inorganic alkaline hydroxide.

10. A finely divided composition of matter comprising the reaction product of a ligno-cellulosic material with sodium hydroxide and with calcium hydroxide.

11. A finely divided composition of matter comprising the reaction product of a ligno-cellulosic material with an alkali metal hydroxide and a difficultly soluble inorganic alkaline hydroxide in quantities which react with the lignin content of the material at least in part and provide insoluble lignin derivatives in the mass.

12. A finely divided composition of matter comprising the reaction product of a ligno-cellulosic material with an alkali metal hydroxide and a difficultly soluble inorganic alkaline hydroxide, the hydroxides being in substantially equimolecular quantities and the product formed being a finely divided mass of chemically altered particles, containing insoluble lignin derivatives.

13. A reaction mass of finely divided particles comprising endocarps of drupes modified by the presence of insoluble reaction products of the ligneous components thereof resulting from the reaction of the drupes with an alkali metal hydroxide and a difficultly soluble inorganic alkaline hydroxide.

14. A reaction mass of finely divided particles comprising vegetable materials composed essentially of the non-fibrous component of bark phloem modified by the presence of insoluble reaction products of the ligneous components thereof resulting from the reaction of the phloem component with an alkali metal hydroxide and a difficultly soluble inorganic alkaline hydroxide.

15. A reaction mass of finely divided particles comprising ligno-cellulosic hydrolysis degradation products of vegetable materials of high extractable pentosan content modified by the presence of insoluble reaction products of the ligneous components thereof, resulting from the reaction of said products with an alkali metal hydroxide and a difficultly soluble inorganic alkaline hydroxide.

16. A composition of matter composed of an aqueous paste containing in finely divided form endocarps of drupes modified by reaction with an alkali metal hydroxide and with a difficultly soluble inorganic alkaline hydroxide, followed by removal of any excess water present, thereby forming the paste.

17. A composition of matter composed of an aqueous paste containing in finely divided form substantially insoluble vegetable materials composed essentially of the non-fibrous component of bark phloem modified by reaction with an alkali metal hydroxide and with a difficultly soluble inorganic alkaline hydroxide, followed by removal of any excess water present, thereby forming the paste.

18. A composition of matter composed of an aqueous paste containing in finely divided form the substantially insoluble reaction product of ligno-cellulosic hydrolysis degradation products of vegetable materials of high extractable pentosan content formed by modification of said degradation products through the action of both an alkali metal hydroxide and a difficultly soluble inorganic alkaline hydroxide, followed by removal of any excess water present, thereby forming the paste.

References Cited in the file of this patent

UNITED STATES PATENTS

| | | |
|---|---|---|
| 504,988 | Mellinger | Sept. 12, 1893 |
| 1,598,039 | Bentley | Aug. 31, 1926 |
| 2,319,182 | Von der Pyl | May 11, 1943 |
| 2,507,465 | Ayers | May 9, 1950 |
| 2,574,803 | Van Beckum | Nov. 13, 1951 |